(12) United States Patent
Dinkel et al.

(10) Patent No.: US 6,260,933 B1
(45) Date of Patent: Jul. 17, 2001

(54) ELECTROHYDRAULIC UNIT FOR PRESSURE CONTROL IN BRAKE SYSTEMS FOR AUTOMOTIVE VEHICLES

(75) Inventors: Dieter Dinkel, Eppstein; Albrecht Otto, Schöneck; Stephan Risch, Weiterstadt; Georg Sonnenschein, Eschborn, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/381,878

(22) PCT Filed: Mar. 23, 1998

(86) PCT No.: PCT/EP98/01694

§ 371 Date: Jan. 20, 2000

§ 102(e) Date: Jan. 20, 2000

(87) PCT Pub. No.: WO98/42552

PCT Pub. Date: Oct. 1, 1998

(30) Foreign Application Priority Data

Mar. 24, 1997 (DE) ............................... 197 12 211

(51) Int. Cl.$^7$ ............... B60T 8/32; B60T 8/36; B60T 17/02; B60T 17/04
(52) U.S. Cl. .................. 303/113.1; 303/DIG. 10
(58) Field of Search ............ 303/DIG. 11, 113.1, 303/119.2, 119.3, 116.1–116.4, 113.2, 113.3, 10–12; 137/884, 596.17

(56) References Cited

U.S. PATENT DOCUMENTS

| | | | |
|---|---|---|---|
| 4,606,585 | * | 8/1986 | Farr et al. . |
| 4,618,188 | * | 10/1986 | Nishimura et al. . |
| 4,668,023 | * | 5/1987 | Every et al. . |
| 4,796,958 | * | 1/1989 | Brown, Jr. . |
| 4,840,566 | * | 6/1989 | Kuromitsu et al. . |
| 4,953,918 | * | 9/1990 | Hashida et al. . |
| 5,011,238 | * | 4/1991 | Brown, Jr. . |
| 5,244,262 | * | 9/1993 | Kell et al. .................. 303/119.2 |

(List continued on next page.)

FOREIGN PATENT DOCUMENTS

| | | |
|---|---|---|
| 40 13 160 | 10/1991 | (DE) . |
| 42 34 013 | 4/1994 | (DE) . |
| 44 06 269 | 9/1994 | (DE) . |
| 91 16220 | 10/1991 | (WO) . |
| 94 08830 | 4/1994 | (WO) . |
| 9842552 | * 10/1998 | (WO) . |

OTHER PUBLICATIONS

Search Report of the German Patent Office for Application No. 197 12 211.6
Jonner W–D et al.: "Antiblackiersystem und Antriebsschlupfregelung der Fünften Generation". In: ATZ Automobitechnische, 1993, vol. 95, No. 11. Stuttgart, Germany p. 572–574, 579–580.

*Primary Examiner*—Douglas C. Butler
(74) *Attorney, Agent, or Firm*—Rader, Fishman & Grauer PLL

(57) ABSTRACT

In an electrohydraulic unit for pressure control in brake systems for automotive vehicles which includes mechanical, hydraulic and/or electric structural elements such as control valves, accumulator pistons, pump components and pump drive parts arranged in accommodating bores of a one-part housing, and with parallel accommodating bores for control valves disposed in pairs side by side in two rows in a housing surface, the control valves which are connected to the slave cylinders of one vehicle axle that have a volume requirement lower than the volume requirement of the slave cylinders of the other vehicle axle, and the accommodating bores of these control valves have a smaller diameter and are arranged offset from the middle of the row in the direction of a lateral housing surface.

5 Claims, 5 Drawing Sheets

U.S. PATENT DOCUMENTS

| | | | | |
|---|---|---|---|---|
| 5,403,077 | * | 4/1995 | Burgdorf et al. | 303/113.1 |
| 5,429,425 | * | 7/1995 | Drott . | |
| 5,529,389 | * | 6/1996 | Sekiguchi | 303/113.1 |
| 5,577,813 | * | 11/1996 | Zaviska | 303/116.4 |
| 5,593,216 | * | 1/1997 | Hosoya et al. | 303/119.2 |
| 5,620,028 | * | 4/1997 | Johnston et al. | 303/113.1 |
| 5,975,652 | * | 11/1999 | Otto | 303/113.1 |
| 5,988,767 | * | 11/1999 | Inoue et al. | 303/DIG. 10 |

* cited by examiner

ELECTROHYDRAULIC UNIT FOR PRESSURE CONTROL IN BRAKE SYSTEMS FOR AUTOMOTIVE VEHICLES

TECHNICAL FIELD

The present invention relates to an electrohydraulic unit for pressure control in brake systems for automotive vehicles which includes mechanical, hydraulic and/or electric structural elements.

BACKGROUND OF THE INVENTION

In an electrohydraulic unit of this general type referred to hereinabove WO94/08830A, the axes of the accommodating bores for the control valves lie in two parallel planes and have equal dimensions. This has detrimental effects on the overall size of the housing.

An object of the present invention is to reduce the mounting space required for the housing in a unit of the type mentioned hereinabove without suffering from disadvantages in terms of function and rendering the manufacture more expensive.

According to the present invention, this object is achieved because the control valves, which are connected to the slave cylinders of one vehicle axle that have a volume requirement lower than the volume requirement of the slave cylinders of the other vehicle axle, and the accommodating bores of these control valves have a smaller diameter and are arranged offset from the middle of the row in the direction of the third housing surface.

The present invention is based on the recognition that the volume requirement of the slave cylinders on the rear axle of the vehicle, which is low in most vehicle brake systems, permits greatly reducing the size of the control valves for controlling the braking pressure of the slave cylinders without impairing the function, and that the reduction in size of the control valves can favorably be used to reduce the mounting space required for the housing of the electrohydraulic unit by moving the accommodating bores for the control valves closer together and by arranging them offset to one housing side. The space obtained by this measure permits moving the bores of the pressure accumulators closer to the middle of the housing so that the overall length of the housing in the axial direction of the bores can be shortened, yet the accumulator volume is maintained. When the accommodating bores with equal diameter are disposed in both bore rows side by side, the housing may be reduced in size in the direction of the bore rows in addition. The reduced dimensions of the housing and the reduced efforts in machining the smaller accommodating bores and the smaller valve designs additionally achieve a reduction of manufacturing costs.

According to the present invention, a supplementary measure of diminishing the housing dimensions may involve that the bores of the damping chambers are configured as stepped bores whose small-diameter step projects over the bottom of the adjacent accommodating bores. Further, it may be provided that the axes of the two steps of the stepped bores are arranged in parallel to one another so that the position of the small step is to a certain degree independent of the position of the large step.

The design of the electrohydraulic unit according to the present invention further renders it possible to arrange an additional arcuate row of large-size accommodating bores for accommodating further control valves between the bores of the pressure accumulators and the damping chambers and the accommodating bores adjacent thereto by only extending the housing in one direction, i.e., in the direction of the bore axes of the pressure accumulators. The further control valves are used for an automatic activation of the brake system, for example, for traction slip or driving stability control. The arrangement of the additional valve row offers the advantage that the bore pattern for the passages for connecting the accommodating bores, connecting bores and pressure accumulator and damping chamber bores in a housing without additional valve row and a housing with an additional valve row may be identical except for minor modifications, and that only a small number of additional passage bores are required for connecting the additional valve row. This facilitates chip-cutting machining operations, and the number of tools necessary remains small. Also, the assembly of the structural elements is simple because identical structural elements are always seated in the same location.

DETAILED DESCRIPTION OF THE PREFERRED EMBODIMENTS

Figure 1:
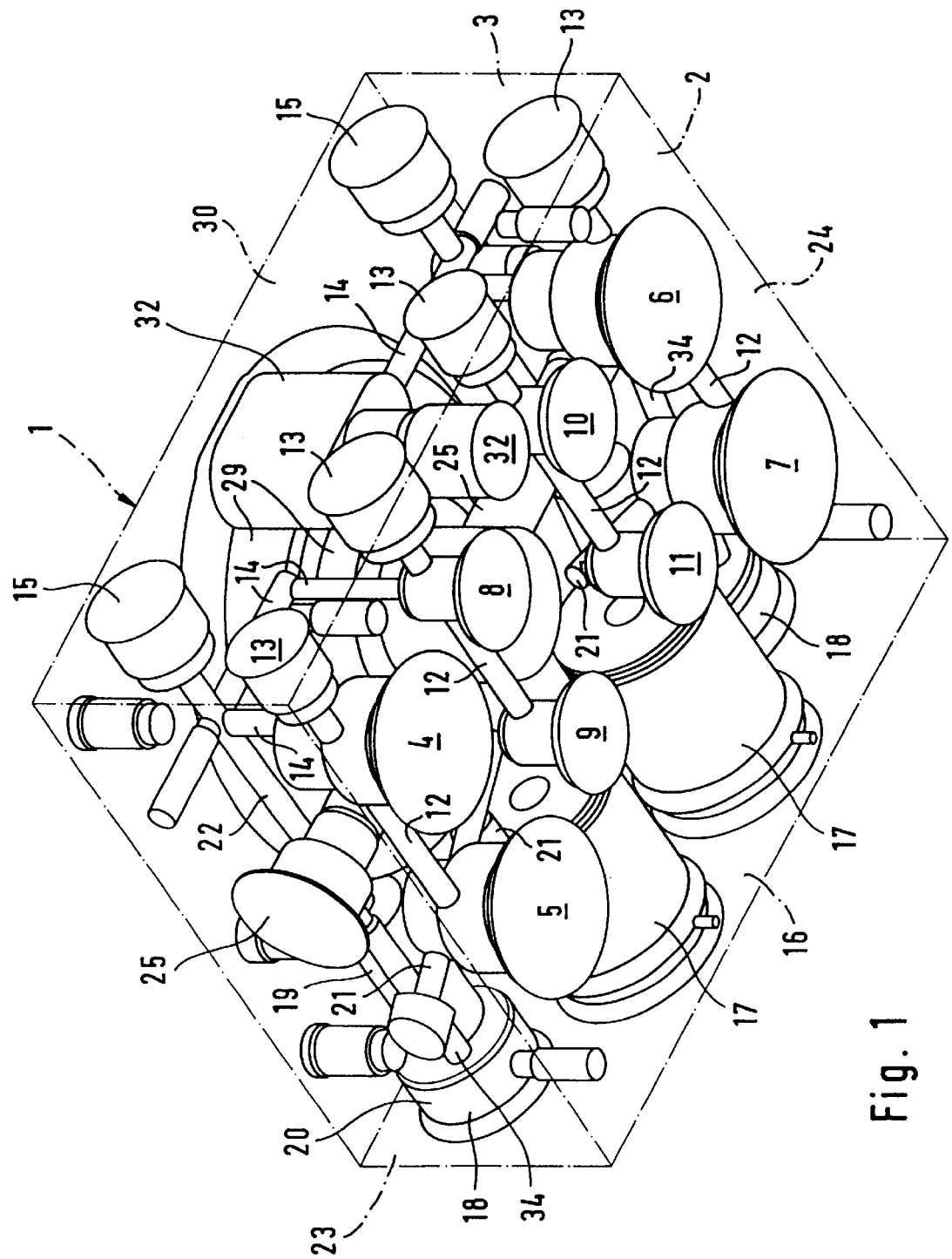
FIG. 1 is a bottom view of the housing of a first embodiment of the unit of the present invention.
Figure 2:
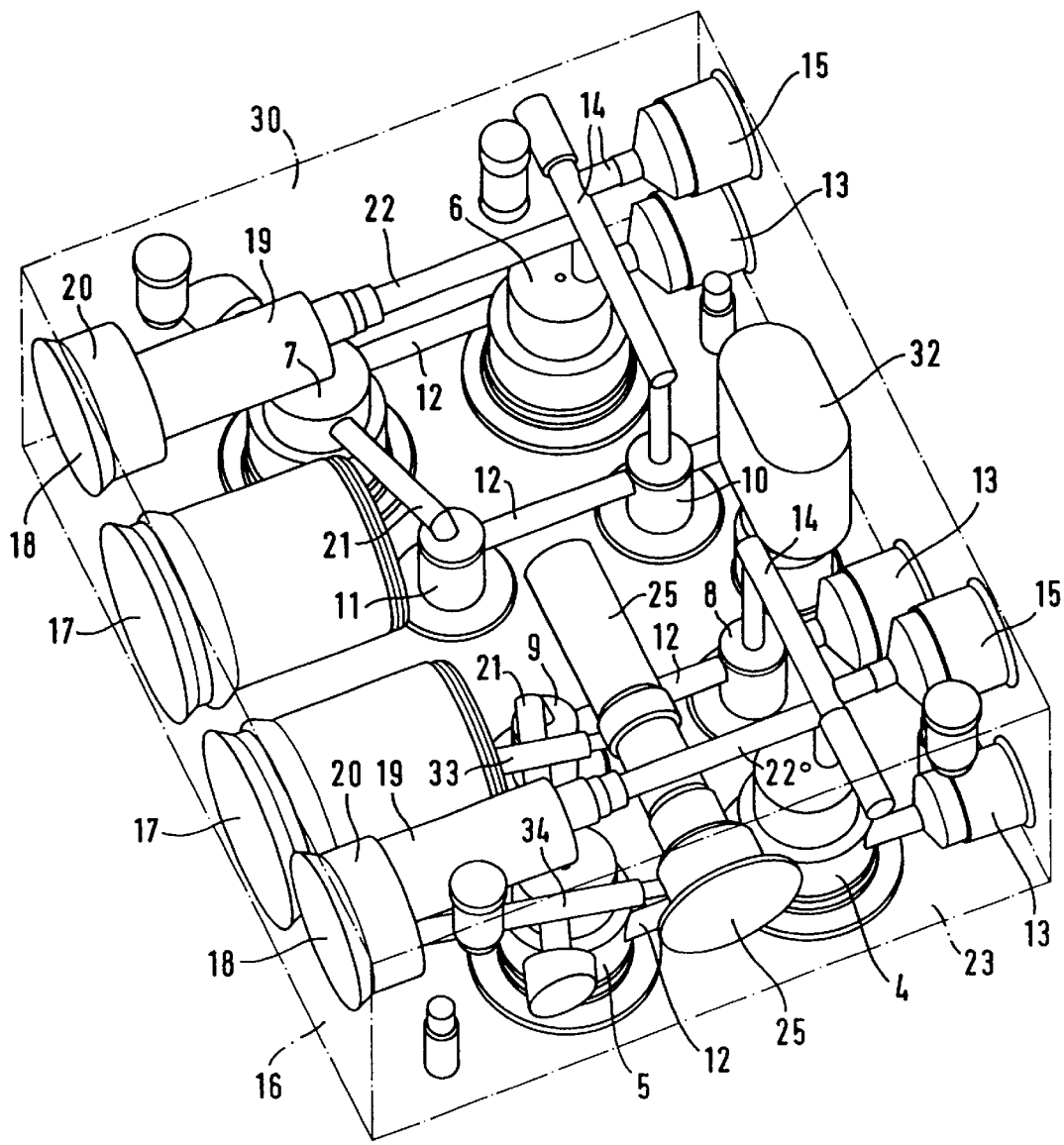
FIG. 2 is a to view of the housing of FIG. 1.

The housing 1 shown in the embodiments of FIGS. 1 and 2 has the shape of a flat square element and is made of a material such as an aluminum alloy which permits machining. On the bottom side 2 of the housing, accommodating bores 4 to 11 for housing electromagnetic control valves and vertically disposed to the housing surface 2 are arranged in two side-by-side rows which are generally in parallel to a housing edge 3. Two adjacent accommodating bores of both rows are connected to each other by passage bores 12 and connected to connecting bores 13 to which pressure fluid lines leading to slave cylinders are connectable. The connecting bores 13 are arranged in the housing surface 3, and the passage bores 12 extend vertically to the housing surface 3. The accommodating bores 4, 8, on the one hand, and 6, 10, on the other hand, are interconnected by passage bores 14 which meet at right angles and are parallel to the housing surfaces, and connected to a connecting bore 15 for a pressure line leading to a master cylinder. The accommodating bores 8 to 11 are placed in the middle between the accommodating bores 4 to 7 and have a considerably smaller diameter and a reduced depth compared to bores 4 to 7. In addition, the accommodating bores 8 to 11 are arranged offset in such a manner that their center-to-center distance from the housing surface 3 is smaller than the respective center-to-center distance of the accommodating bores 4 to 7. This achieves a free space between the accommodating bores 9, 11 and the housing surface 16 opposite to the housing surface 3 for two bores 17 which are arranged in the housing surface 16, envisaged for the accommodation of accumulator pistons and serving as pressure accumulators. On both sides of bores 17, the housing surface 16 includes stepped bores 18 which are intended for forming damping chambers. The small step 19 of bores 18 is arranged eccentrically to the large step 20 and extends until over the bottom of the accommodating bores 5, 7. Bores 17 are connected to the accommodating bores 5, 9 or 7, 11 by way of passage bores 21. Bores 18 are connected to the passage bores 14 by way of passage bores 22.

Figure 3:
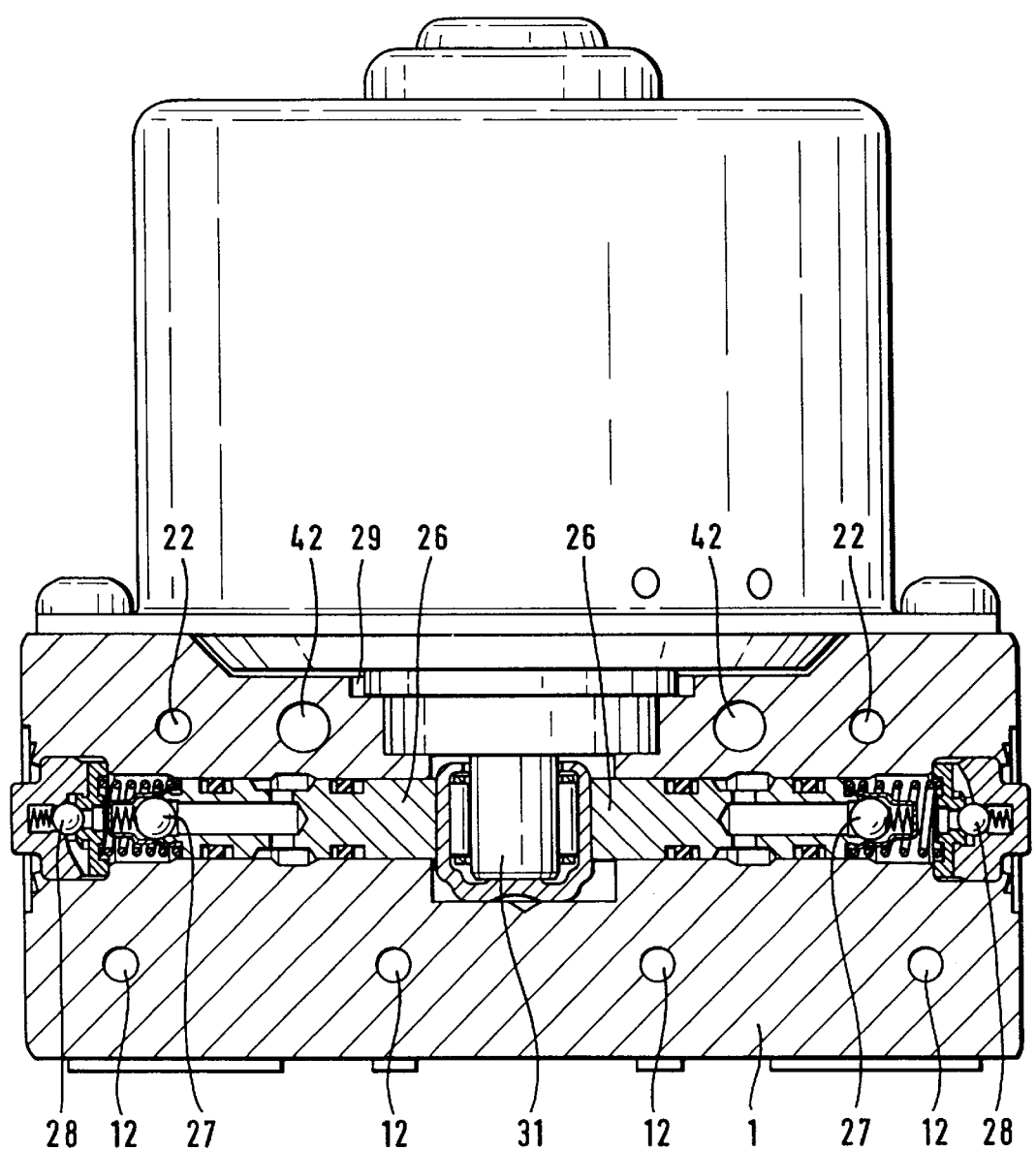
FIG. 3 is a cross-section taken through the housing of FIG. 1 with a pump installed.

Cylinder bores 25 which are vertical to the housing surfaces 23, 24 are arranged in the lateral opposing housing surfaces 23, 24 which extend between the housing surfaces 3 and 16. Cylinder bores 25 are disposed inside the housing 1 between the two rows of accommodating bores 4 to 11 as well as between the passage bores 12 and 22. The cylinder bores 25 are used to accommodate two pump pistons 26, the suction valves 27 and the pressure valves 28 of the pump, as becomes apparent from FIG. 3. The facing ends of the cylinder bores 25 open into an accommodating bore 29 which is placed in the center of the top housing side 30 and is used to accommodate the electromotive pump drive 31. The accommodating bore 29 is expanded in several steps from inwards towards outwards. A through-bore 32 is provided as a cable duct in parallel to the accommodating bore 29. The cylinder bores 25 are connected to the bores 17 by way of a passage bore 33 and to the bores 18 by way of a passage bore 34.

The housing 1 is instrumented with electromagnetic control valves in two sizes. Control valves of large dimensions are mounted into the accommodating bores 4 to 7, and control valves of small dimensions are mounted into the accommodating bores 8 to 11. The large-size control valves are normally connected to the slave cylinders on the front axle of a vehicle because they have an increased volume requirement. The small-size control valves are connected to the slave cylinders of the rear axle. Control valves which are open in their initial position are inserted into the accommodating bores 4, 6, 8, 10, and control valves closed in their initial position are inserted into the accommodating bores 5, 7, 9, 11. A particularly compact electrohydraulic unit for brake slip control in a brake system with two independent brake circuits is achieved by means of the configuration of the housing 1 as described hereinabove. The design of the housing 1 which is symmetrical with respect to the median plane between the housing surfaces 23, 24 takes into account the split-up into two brake circuits.

Figure 4:
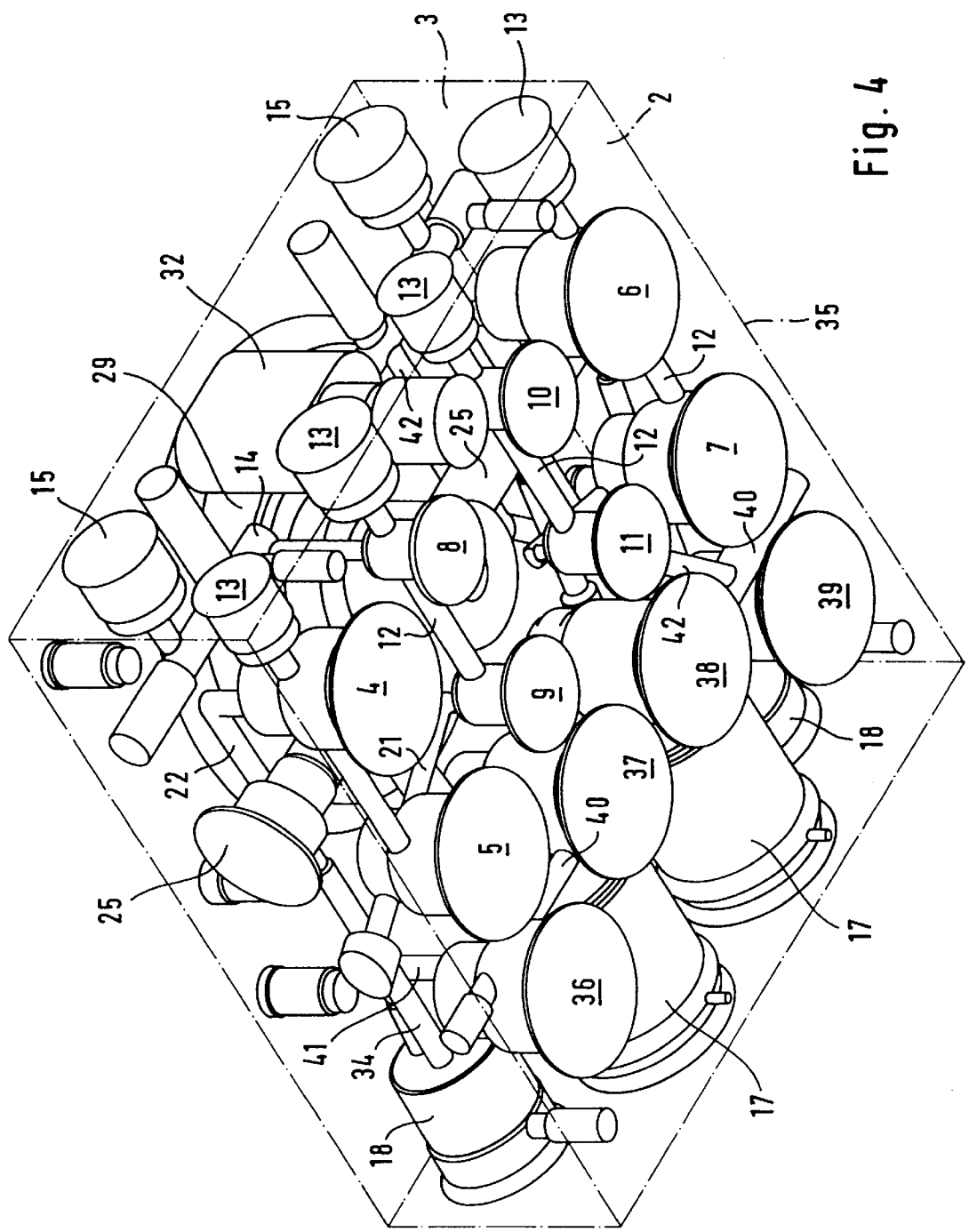
FIG. 4 is a bottom view of the housing of a second embodiment of the unit of the present invention.
Figure 5:
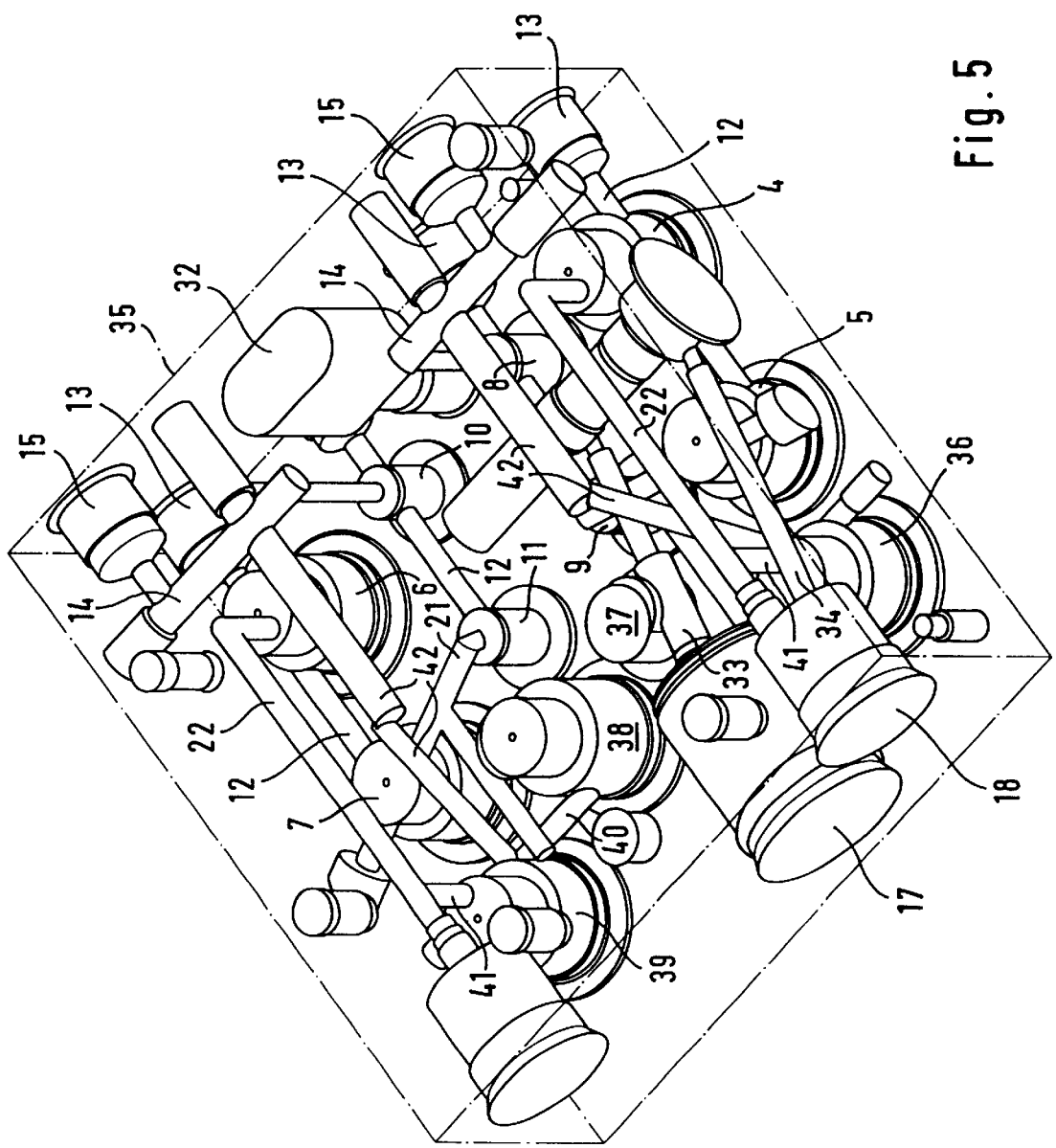
FIG. 5 is a top view of the housing of FIG. 3.

The embodiments of FIGS. 4 and 5 exhibit a housing 35 for an electrohydraulic unit which also permits an automatic activation of the brake system for traction slip control or driving stability control, independent of the driver, in addition to the functions which can be achieved by way of the housing 1 described hereinabove. To this end, the housing 35 includes the additional features which differ from those of housing 1 and will be described hereinbelow. Four additional accommodating bores 36 to 39, whose diameter corresponds basically to the diameter of the large accommodating bores 4 to 7, are arranged in a bent row between the accommodating bores 5, 7, 9, 11 and the bores 17, 18. The arrangement of the accommodating bores 36 to 39 in a bow is rendered possible by the smaller diameter of the accommodating bores 8 to 11 and provides the advantage of removing the need to expand the housing 35 in comparison to housing 1 in order to incorporate the accommodating bores 36 to 39. Each of the accommodating bores 36 or 39 are connected to the accommodating bores 37 or 38 by way of a passage bore 40. Further, one passage bore 41 respectively leads from the bottom of the accommodating bores 36, 39 to the passage bore 22. The passage bores 22, different from housing 1, exactly as the accommodating bores 4 and 6 are separated from the connecting bores 15 and the accommodating bores 8, 10. Instead, passage bores 42 which branch off from the passage bores 14 connect the connecting bores 15 to the accommodating bores 36, 39 and, by way of the passage bores 40, also to the accommodating bores 37 and 38. Besides, the accommodating bores 37 and 38 are connected to the passage bores 33 and, via these, to the bores 17 and the cylinder bores 25. A bore 17 and the accommodating bore 29 have been omitted in FIG. 5 for the sake of clarity.

The accommodating bores 36, 39 house electromagnetically operable separating valves which are open in their initial position and connect the connecting bores 15 to the accommodating bores 4 or 6. When the separating valves are actuated, they shut off the conduit in the direction of the connecting bores 15 as long as the pressure in the passage bores 22 does not exceed a predetermined limit value. Electromagnetically operable change-over valves are mounted into the accommodating bores 37, 38 which are closed in their initial position and, upon actuation, provide a connection between the passage bores 33 that lead to the suction side of the pump cylinders and the connecting bores 15 and the master cylinders connected thereto. When the separating valves and the change-over valves adopt their initial position, the hydraulic circuit diagram of the housing 35 in its function corresponds to that one of housing 1. When the separating valves and the change-over valves are operated and the pump drive is switched on, an automatic activation of the slave cylinders connected to the connecting bores for traction slip control or driving stability control can be effected by actuating the large-size control valves in the accommodating bores 4 to 7.

What is claimed is:

1. Electrohydraulic unit for pressure control in brake systems for automotive vehicles, comprising:

a one-part housing including a plurality of parallel accommodating bores provided with control valves and disposed in pairs side by side in two rows in a first housing surface, parallel bores for forming pressure accumulators and damping chambers in a second housing surface which extends in the direction of the rows, and connecting bores for pressure fluid lines in a third housing surface, the said pressure fluid lines leading to a master and a slave cylinder of the brake system, wherein between the two rows of accommodating bores for the control valves there are arranged cylinder bores which extend in the direction of the rows and accommodate a piston and a valve of a pump, an accommodating bore for a pump drive, wherein the bores of the pressure accumulators are disposed between the bores of the damping chambers, wherein the accommodating bores for the control valves which are connected to a slave cylinder of one vehicle axle that have a volume requirement lower than the volume requirement of the slave cylinders of the other vehicle axle, have a smaller diameter and are arranged offset from the middle of the row in the direction of the third housing surface.

2. Unit as claimed in claim 1, wherein the accommodating bores provided for the control valves in both bore rows are of equal diameter and arranged side by side.

3. Unit as claimed in claim 1, wherein the bores of the damping chambers are configured as stepped bores whose small-diameter step projects over a bottom of an adjacent accommodating bore.

4. Unit as claimed in claim 3, wherein the bores of the damping chambers are arranged generally parallel to one another.

5. Unit as claimed in claim 1, further including an additional arcuate row of large-size accommodating bores for accommodating further control valves, which is arranged between the bores of the pressure accumulators and the damping chambers and the accommodating bores adjacent thereto, said further control valves being used for activating a traction slip or driving stability control system.

* * * * *